United States Patent [19]

Jeong et al.

[11] Patent Number: 5,218,489
[45] Date of Patent: Jun. 8, 1993

[54] AUTO TRACKING APPARATUS FOR VIDEO TAPE RECORDER

[75] Inventors: Seog-wu Jeong; Bong-keun Hong, both of Kyunggi, Rep. of Korea

[73] Assignee: Samsung Electronics Co., Ltd., Kyongki, Rep. of Korea

[21] Appl. No.: 524,918

[22] Filed: May 18, 1990

[30] Foreign Application Priority Data

May 20, 1989 [KR] Rep. of Korea ............... 89-6722[U]

[51] Int. Cl.$^5$ ............................................. G11B 5/584
[52] U.S. Cl. ................................. 360/70; 360/77.13
[58] Field of Search ................. 360/77.13, 77.14, 70, 360/73.04, 73.09, 73.12

[56] References Cited

U.S. PATENT DOCUMENTS 5,055,952  10/1991  Noh .................................. 360/77.15

OTHER PUBLICATIONS

Millman, Jacob, *Microelectronics*, McGraw-Hill Book Co., 1979, p. 646.

*Primary Examiner*—Joseph L. Dixon
*Assistant Examiner*—David L. Robertson
*Attorney, Agent, or Firm*—Robert E. Bushnell

[57] ABSTRACT

An auto tracking apparatus for automatically controlling tracking by using the head switching pulse and the envelope waveform of the composite video signal which is generated by a reproducing head. The auto tracking apparatus includes, an envelope detection means for detecting the envelope waveform of the frequency modulated signal detected by the reproducing head, a waveform shaping means for shaping the envelope waveform detected by the envelope detection means into a direct current, a second amplifier means for amplifying a pulse train generated in response to a head switching pulse, and for filtering the pulse train, a comparator means for comparing the filtered sampling pulse with the signal outputted from the second amplifier means, and for outputting the pulse as a different duty cycle, and microcomputer means for controlling the servo stage based on the output signal from the comparator means, sampling the head switching pulse with a constant interval, and supplying it to the second amplifier means.

12 Claims, 3 Drawing Sheets

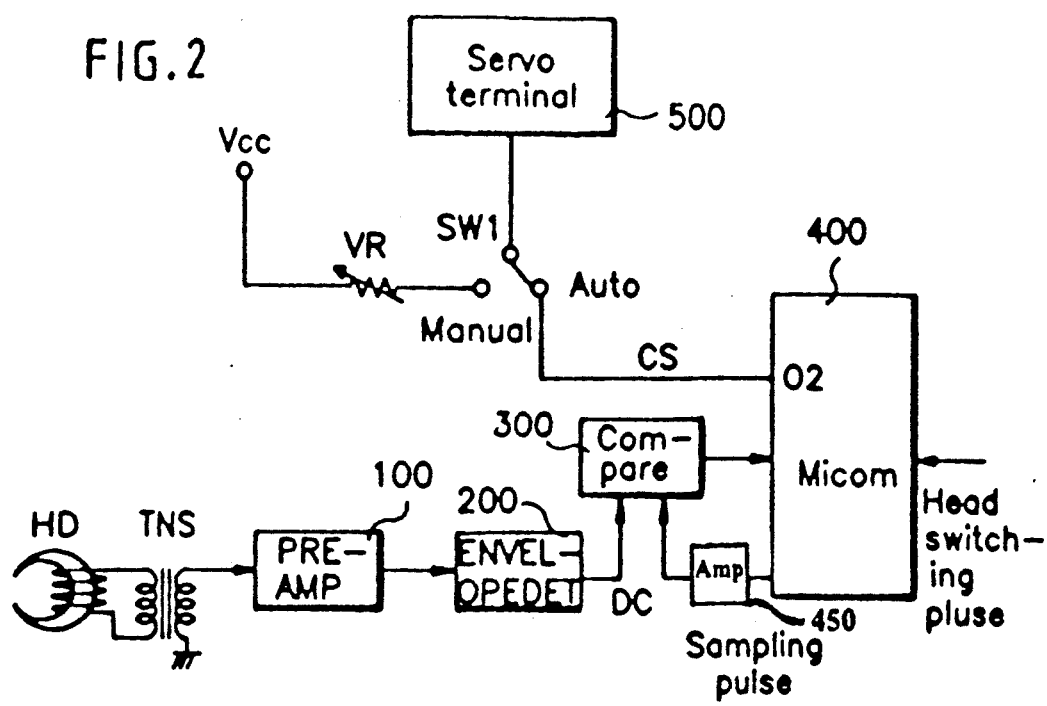
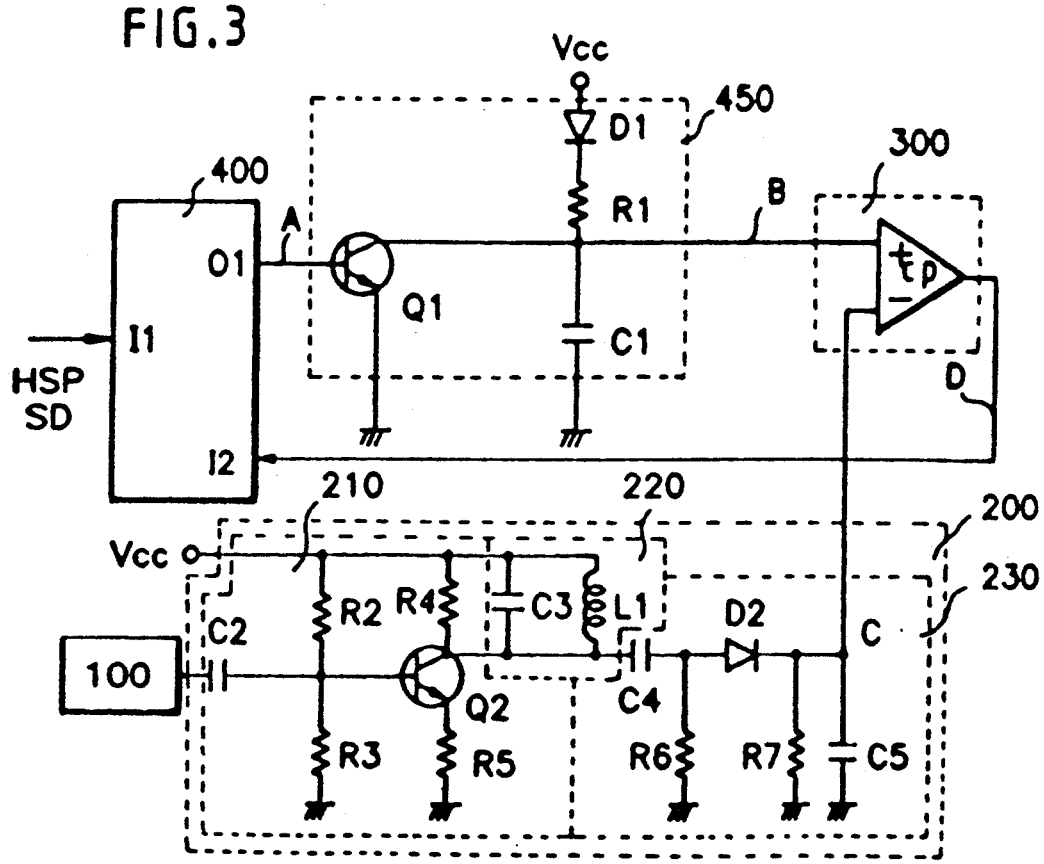

AUTO TRACKING APPARATUS FOR VIDEO TAPE RECORDER

BACKGROUND OF THE INVENTION

The present invention relates generally to video tape recorder, and more particularly to an auto tracking apparatus for automatically controlling tracking by utilizing the head switching pulse and the envelope waveform of the composite video signal detected by a reproducing head.

Various auto tracking apparatus have recently been put to practical use in the field of video tape recorders in order that a magnetic head can accurately scan a video signal-recorded track during reproduction, particularly, speed-varying reproduction such as slow-motion reproduction.

An example of a conventional auto tracking apparatus is disclosed in U.S. Pat. No. 4,451,860 or Japanese Patent Provisional publication No. 57-66526. These patents teach sampling and holding the detection output of a reproduction high frequency signal at a given point in a field and controlling the head position to keep the level of the detection output at a maximum.

However, such prior art apparatus encounter difficulty ensuring effective tracking control where the following of the track is not parallel to the center line thereof, because the sampling of the detection output signal is performed at only one point for each of plurality of fields. Thus, accuracy of the tracking by the reproducing head requires improvement.

U.S. Pat. No. 4,720,753 discloses an auto tracking apparatus for solving the above-mentioned problems. A schematic block diagram of the auto tracking apparatus for the above publication is shown in FIG. 1.

This auto tracking apparatus is arranged to divide a tracking period of one field of a frame into a plurality of time domains and to sample and hold the envelope detection output signal of a reproduced high frequency signal of every time domain.

However, for achieving these features, that apparatus has a relatively complex construction; it would be desirable to provide more simplified and improve apparatus in its construction.

BRIEF SUMMARY OF THE INVENTION

It is therefore an object of the present invention to provide an auto tracking apparatus for automatically controlling the head having a simple circuit construction.

For achieving this and other objects, the present invention includes: an envelope detector for detecting the envelope waveform of the FM signal which is picked-up by the reproducing head; a waveform shaper for shaping the envelope waveform which is detected from the envelope detector into a direct current; a second amplifier for amplifying a pulse train generated at a predetermined number n of pulses per a constant period in response to a head switching pulse, and for providing a sawtooth signal by slowing the rise time, tilting, of the sampling pulse; a comparator for comparing the sawtooth signal from the waveform shaper with the signal from the second amplifier, and for providing a pulse as a different duty cycle; and microcomputer for the servo stage based on the pulse from the comparator and generating the pulse train in response to the head switching pulse which is applied to the second amplifier.

According to the auto tracking apparatus of the present invention, the envelope waveform of the video signal picked up from the reproducing head is substantially shaped to D.C., then the envelope waveform is compared with the pulse train. The microcomputer receives the result of the comparison and the duty cycle is changed to control the servo stage, thereby automatically controlling the tracking.

BRIEF DESCRIPTION OF THE DRAWINGS

FIG. 2 is a block diagram showing the auto tracking apparatus according to the present invention.

FIG. 3 is a detailed circuit diagram showing a preferred embodiment of the auto tracking apparatus shown in FIG. 2.

DETAIL DESCRIPTION OF THE INVENTION

Figure 1:
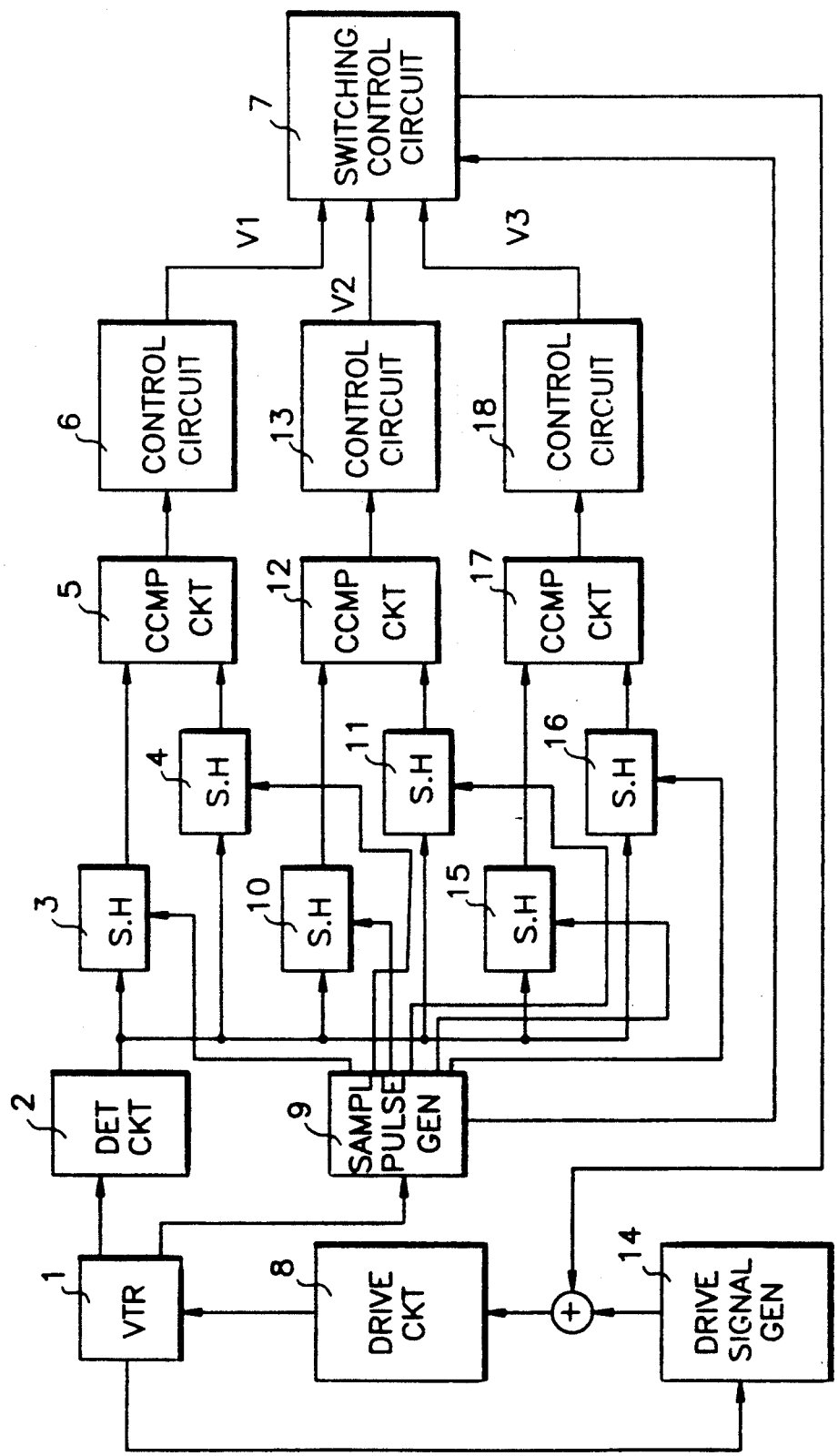
FIG. 1 is a block diagram showing a circuit arrangement of the auto tracking apparatus according to the prior art.

A block diagram of the auto tracking apparatus according to the present invention is shown in FIG. 2.

Referring to FIG. 2, a video signal (e.g., a frequency modulated video signal) detected by a reproducing head HD is supplied to a preamplifier 100 through a rotary transformer TNS, and an amplified frequency modulated signal from the preamplifier 100 is supplied to one input stage of a comparator 300 through envelope detector 200. Meanwhile, a pulse train generated in response to head switching pulse HSP from the microcomputer 400 is supplied to the other input stage of the comparator 300, additionally, a control signal CS generated by the microcomputer 400 is supplied to the servo stage 500 through a switch SW1 for automatically controlling tracking.

FIG. 3. shows a detailed circuit diagram of the auto tracking apparatus shown in FIG. 2.

Referring to FIG. 3, a first amplifier 210 for amplifying the frequency modulated video signal outputted from the preamplifier 100 includes a capacitor C2 coupled between the output of preamplifier 100 and the control electrode of a transistor Q2 for amplifying the coupled FM signal, and bias resistors R2 to R5.

A band pass filter 220 includes a capacitor C3 and a coil 11 connected in parallel between the power source supply and the collector of the transistor Q2 so as to pass a frequency band of the amplified frequency modulated signal. A waveform shaper 230 includes resistors R6 and R7, capacitors C4 and C5, and a diode D2 to shape the frequency modulated signal.

A comparator 300 compares a signal B from the second amplifier 450 with the signal from the waveform shaper 230, and supplies the compared data D to the microcomputer 400.

The switch SW1, connected so that the servo stage 500, can be selectively connected to the output port O2 of the microcomputer 400 or a variable resistor VR so that tracking can be automatically or manually controlled.

Figure 4:
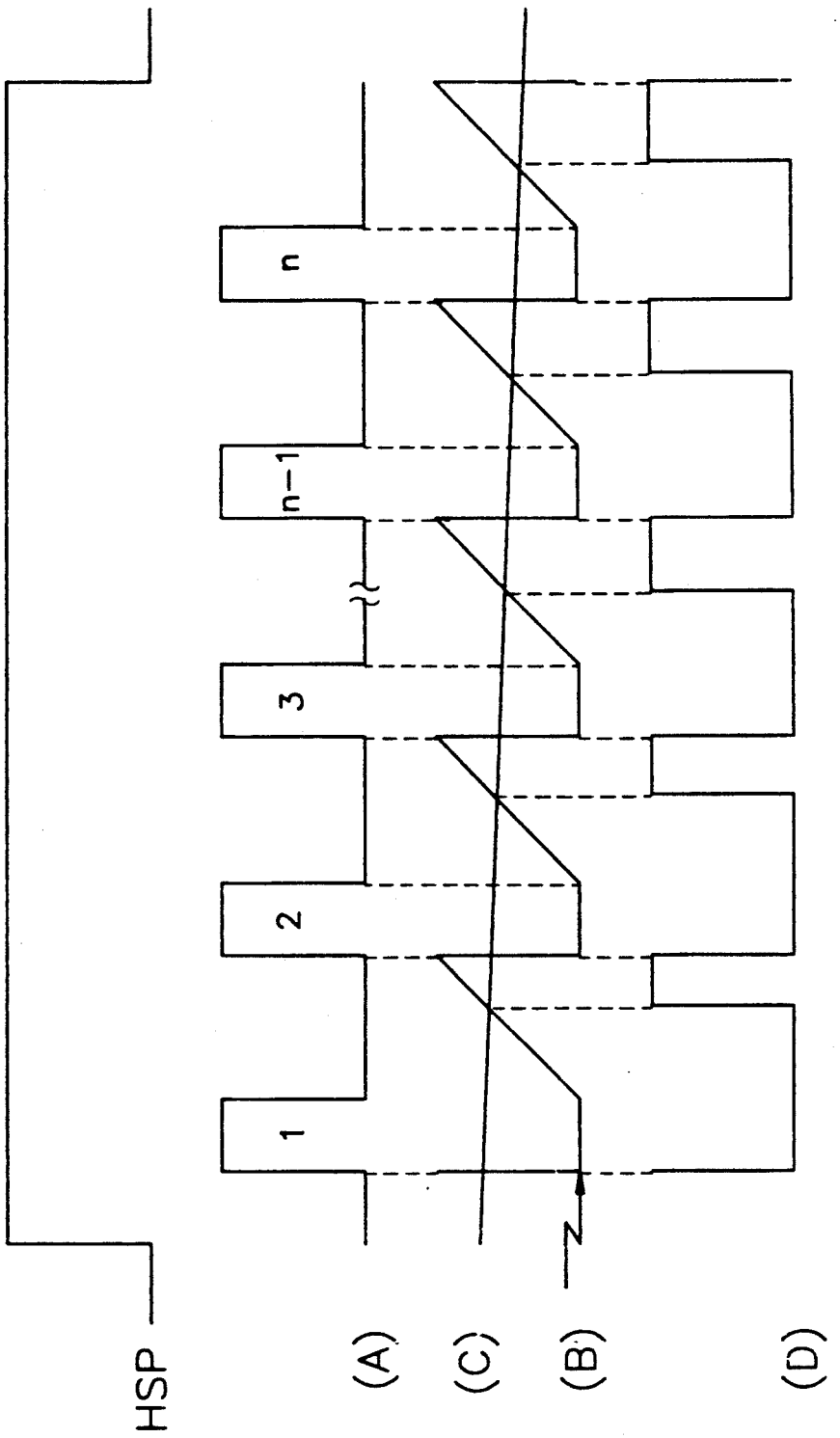
FIG. 4 is an input/output waveform diagram for explaining the operation of the auto tracking apparatus shown in FIG. 3.

The auto tracking operation based on the foregoing arrangement shown in FIG. 2 will be better understood with reference to FIG. 4 which illustrates each waveform.

Referring to FIG. 2, switch SW1 selects whether tracking is manual or automatic. That is, if user intends to control the tracking manually, the movable contact of the switch SW1 is connected to the variable resistor VR and tracking is controlled at the servo stage 500 based on control of the variable resistor VR, while, if the switch SW1 is connected to the microcomputer, the tracking is automatically controlled as described below.

The video signal which is picked up by the reproducing head HD shown in FIG. 2 is applied to the envelope detector 200. The head switching pulse, represented by HSP in FIG. 4, is supplied to the input port I1 of the microcomputer 400, with the result that the pulse train A having a predetermined number n of pulses for every period of the head switching pulse is provided at the output port O1 of the microcomputer 400 and supplied to the second amplifier 450.

If the video tape recorder is PAL type, the width of the head switching pulse is 25 Hz and the period of one channel is 20 ms. The high level of the pulse of the pulse train is 0.5 ms, the pulse train as shown in FIG. 4A is outputted.

The sampling pulse supplied to the second amplifier 450 is amplified by the transistor Q1, then the slope is changed to generate a sawtooth signal as is shown in FIG. 4B and supplied to the non-inverting terminal + of the comparator CP 300.

The FM signal which is the envelope waveform outputted from the preamplifier 100 is supplied to the first amplifier 210 in the envelope detector 200.

The frequency modulated signal supplied to the first amplifier 210 passes through the coupling capacitor C2 and is amplified by the transistor Q2, then the amplification of the desired frequency band is increased by the band pass filter 220.

As described above, the frequency modulated signal is shaped to substantially D.C. as shown in FIG. 4C through the waveform shaper which is composed of capacitors C4 and C5, resistors R6 and R7, and diode D2, and is supplied to the inverting terminal — of the comparator CP.

Therefore, the envelope detecting output signal D shown in FIG. 4D obtained by comparing the signal B with the signal C in the comparator CP is supplied to the input port I2 of the microcomputer 400, at this time, envelope detecting output signal is changed in duty ratio based on the detected envelope waveform. That is, since the envelope detected from the envelope detector 200 is changed between about 2.0 V to about 0.6 V, the duty ratio of the envelope detecting output signal supplied to the microcomputer 400 is changed from about 2.5 ms to about 0.5 ms.

As understood above, since the duty ratio difference of the envelope detecting output signal supplied to the microcomputer 400 is 2.0 ms, it results in 20 μs if it is divided by 100.

Accordingly, in the microcomputer, 400, the output signal is stepped up or down based on the duty ratio difference applied by one step, and the resultant tracking control data is supplied to the servo stage 500, so that the tracking is automatically controlled.

It should be apparent from the foregoing description that since the servo stage is controlled on a varying envelope level to control automatically the tracking, the data recorded by the other set can be reproduced with an optimum picture.

What is claimed is:

1. An auto-tracking apparatus for a video tape recorder, comprising:

envelope detection means for detecting an envelope waveform of a frequency modulated video signal detected by a reproducing head;

first amplifier means for amplifying pulse trains generated in response to a head switching pulse;

comparator means for generating comparisons of said envelope waveform and the amplified pulse trains from the first amplifier means; and microprocessor means for generating said pulse trains and for controlling a servo stage to control tracking of said video tape recorder in response to the comparisons generated by the comparator means.

2. The apparatus as claimed in claim 1, wherein said first amplifier means comprises a transistor for amplifying said pulse trains and a capacitor for filtering said pulse trains to generate a sawtoothed shaped signal which is provided to said comparator means as said amplified pulse trains.

3. The apparatus as claimed in claim 1, further comprising a manual tracking circuit for manually overriding tracking control.

4. The apparatus as claimed in claim 1, wherein said envelope detection means comprises second amplifier means for amplifying said frequency modulated video signal, a filtering circuit for passing a frequency band of said frequency modulated video signal amplified by said second amplifier means, and waveform shaping means for shaping said frequency modulated video signal received from said filtering circuit to generate said envelope waveform received by said comparator means.

5. The apparatus as claimed in claim 1, wherein said pulse trains are generated by providing a predetermined number of pulses in a constant period in response to a cycle of said head switching pulse.

6. An auto-tracking apparatus for a video tape recorder, comprising:

envelope detection means for detecting an envelope waveform of a modulated signal detected by a reproducing head;

first means for generating amplified signals by amplifying pulse trains generated in response to head switching pulses at a predetermined rate per a constant period, and for generating intermediate signals by filtering the amplified signals;

comparator means for making a comparison of the intermediate signals and the envelope waveform, and for generating pulse signals exhibiting a duty cycle varying in dependence upon said comparison; and means for generating a control signal for controlling tracking of said video tape recorder based on said pulse signals, generating said pulse trains, and supplying said pulse trains to the first means for generating amplified signals.

7. The apparatus of claim 6, further comprised of said first means for generating amplified signals including:

active means for amplifying the pulse trains to provide said amplified signals; and a capacitor coupled to receive said amplified signals, for filtering said amplified signals to generate said intermediate signals.

8. The apparatus of claim 6, further comprising:

a servo terminal for an auto tracking circuit;

a manual tracking circuit; and means for selectively coupling said servo terminal to said manual tracking circuit to provide manual tracking control.

9. The apparatus of claim 6, further comprised of said envelope detecting means including:
  second means for amplifying the modulated signal;
  filtering means for passing a frequency band of the modulated signal amplified by the second amplifying means, and
  waveform shaping means for shaping said modulated signal to generate said envelope waveform.

10. The apparatus of claim 7, further comprising:
  a servo terminal for an auto tracking circuit:
  a manual tracking circuit; and
  means for selectively coupling said servo terminal and manual tracking circuit to provide manual tracking control.

11. The apparatus of claim 7, wherein said envelope detecting means comprises:
  second means for amplifying the modulated signal; and
  filtering means for passing a frequency band of the modulated signal amplified by the second amplifying means, and
  waveform shaping means for shaping said modulated signal to generate said envelope waveform.

12. The apparatus of claim 10, wherein said envelope detecting means comprises:
  second means for amplifying the modulated signal; and
  filtering means for passing a frequency band of the modulated signal amplified by the second amplifying means, and
  waveform shaping means for shaping said modulated signal to generate said envelope waveform.

* * * * *

UNITED STATES PATENT AND TRADEMARK OFFICE
CERTIFICATE OF CORRECTION

PATENT NO. : 5,218,489
DATED : June 8, 1993
INVENTOR(S) : Seog-wu Jeong, et al.

It is certified that error appears in the above-indentified patent and that said Letters Patent is hereby corrected as shown below:

TITLE PAGE, IN THE ABSTRACT:

Line 16, replace "and microcomputer" with --and a microcomputer--;

Line 19, replace "it" with --the pulse train--;

Column 1,

Line 44, after "provide", insert --a--; and change "improve" to --improved--;

Line 61, after "the rise time, ", add --or--;

Line 65, before "microcomputer", insert --a--; and after "microcomputer for", insert --controlling--.

Signed and Sealed this

Thirteenth Day of September, 1994

Attest:

BRUCE LEHMAN

*Attesting Officer*      *Commissioner of Patents and Trademarks*